(12) United States Patent
Thomas et al.

(10) Patent No.: US 9,283,926 B2
(45) Date of Patent: Mar. 15, 2016

(54) SEAT MOUNTED BUCKLE PRESENTER

(71) Applicant: GM GLOBAL TECHNOLOGY OPERATIONS LLC, Detroit, MI (US)

(72) Inventors: Scott D. Thomas, Novi, MI (US);
George J. Strnad, Rochester, MI (US);
Steven G. Corrion, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/051,613

(22) Filed: Oct. 11, 2013

(65) Prior Publication Data

US 2014/0265503 A1 Sep. 18, 2014

Related U.S. Application Data

(60) Provisional application No. 61/794,053, filed on Mar. 15, 2013.

(51) Int. Cl.
| | |
|---|---|
| *B60R 22/20* | (2006.01) |
| *B60R 22/26* | (2006.01) |
| *B60N 2/16* | (2006.01) |
| *B60R 22/03* | (2006.01) |
| *B60N 2/68* | (2006.01) |
| *B60R 22/02* | (2006.01) |
| *B60R 22/18* | (2006.01) |

(52) U.S. Cl.
CPC . *B60R 22/20* (2013.01); *B60N 2/16* (2013.01); *B60N 2/688* (2013.01); *B60R 22/03* (2013.01); *B60R 22/26* (2013.01); *B60R 2022/021* (2013.01); *B60R 2022/1806* (2013.01)

(58) Field of Classification Search
CPC .. B60R 22/20; B60R 22/26; B60R 2022/021; B60R 2022/208; B60R 22/201; B60R 22/202; B60R 2022/263
USPC ............. 280/801.1, 801.2; 297/468, 473, 481
See application file for complete search history.

(56) References Cited

U.S. PATENT DOCUMENTS

| | | | | |
|---|---|---|---|---|
| 3,737,197 A | * | 6/1973 | Hall et al. ..................... | 297/468 |
| 3,758,158 A | * | 9/1973 | Radke et al. .................. | 297/468 |
| 3,811,727 A | * | 5/1974 | Rumpel ........................ | 297/468 |
| 3,957,304 A | * | 5/1976 | Koutsky et al. ............... | 297/468 |
| 4,225,184 A | * | 9/1980 | Strowick ....................... | 297/468 |

(Continued)

FOREIGN PATENT DOCUMENTS

| | | |
|---|---|---|
| CN | 101130356 A | 2/2008 |
| DE | 102004004402 B3 | 5/2005 |
| DE | 102009052581 A1 | 5/2011 |

*Primary Examiner* — Barry Gooden, Jr.
(74) *Attorney, Agent, or Firm* — Quinn Law Group, PLLC

(57) ABSTRACT

A buckle presenter for moving a seat belt buckle with a vehicle seat of a vehicle is provided. The vehicle seat has a seat frame connected to a seat adjustment mechanism that moves the vehicle seat. The buckle presenter includes an anchor strap and a buckle strap. The anchor strap is anchored with respect to the vehicle seat such that it is substantially restricted from moving when the vehicle seat is being adjusted vertically. The buckle is attachable to the buckle strap, which is connectable to the vehicle seat such that it moves with the vehicle seat when it is being adjusted vertically. The buckle strap is configured to move along the anchor strap. When a load is applied to the seat belt buckle, the buckle strap and the anchor strap are configured to interlock such that the buckle strap is substantially restricted from moving vertically.

15 Claims, 3 Drawing Sheets

(56) References Cited

U.S. PATENT DOCUMENTS

| | | | |
|---|---|---|---|
| 4,239,260 A * | 12/1980 | Hollowell | 280/806 |
| 4,312,539 A * | 1/1982 | Takada | 297/468 |
| 4,487,454 A * | 12/1984 | Biller | 297/468 |
| 4,536,010 A * | 8/1985 | Matsunami et al. | 280/802 |
| 4,790,597 A * | 12/1988 | Bauer et al. | 297/468 |
| 4,906,023 A * | 3/1990 | Kreger et al. | 280/806 |
| 5,015,010 A * | 5/1991 | Homeier et al. | 280/808 |
| 5,020,856 A * | 6/1991 | George | 297/483 |
| 5,219,206 A * | 6/1993 | Anthony et al. | 297/473 |
| 5,219,207 A * | 6/1993 | Anthony et al. | 297/473 |
| 5,226,697 A * | 7/1993 | Borlinghaus et al. | 297/216.18 |
| 5,451,094 A * | 9/1995 | Templin et al. | 297/216.17 |
| 6,142,524 A * | 11/2000 | Brown et al. | 280/806 |
| RE37,123 E * | 4/2001 | Templin et al. | 297/216.17 |
| 6,467,849 B1 * | 10/2002 | Deptolla | 297/464 |
| 6,505,888 B1 * | 1/2003 | Teufel et al. | 297/344.15 |
| 6,517,157 B1 * | 2/2003 | Vorac | 297/344.13 |
| 6,572,065 B2 * | 6/2003 | Koga et al. | 248/421 |
| 6,582,015 B2 * | 6/2003 | Jessup et al. | 297/216.17 |
| 6,902,234 B2 * | 6/2005 | Becker et al. | 297/216.1 |
| 7,036,878 B2 * | 5/2006 | Masutani | 297/216.1 |
| 7,338,118 B2 * | 3/2008 | Ichikawa et al. | 297/216.1 |
| 7,407,193 B2 * | 8/2008 | Yamaguchi et al. | 280/805 |
| 7,527,332 B2 * | 5/2009 | Sakai et al. | 297/216.1 |
| 7,658,443 B2 * | 2/2010 | Musale | 297/216.1 |
| 7,857,350 B2 * | 12/2010 | Yamada et al. | 280/801.1 |
| 8,282,162 B2 * | 10/2012 | Masutani | 297/216.1 |
| 8,864,172 B2 * | 10/2014 | Yilma | 280/801.2 |
| 2002/0021041 A1 * | 2/2002 | Jessup et al. | 297/468 |
| 2003/0177621 A1 * | 9/2003 | Schneider et al. | 24/633 |
| 2006/0017275 A1 * | 1/2006 | Sanchez et al. | 280/801.1 |
| 2006/0181073 A1 * | 8/2006 | Sugiyama et al. | 280/801.1 |
| 2006/0231317 A1 * | 10/2006 | Yamaguchi et al. | 180/268 |
| 2014/0132056 A1 * | 5/2014 | Yilma | 297/481 |

* cited by examiner

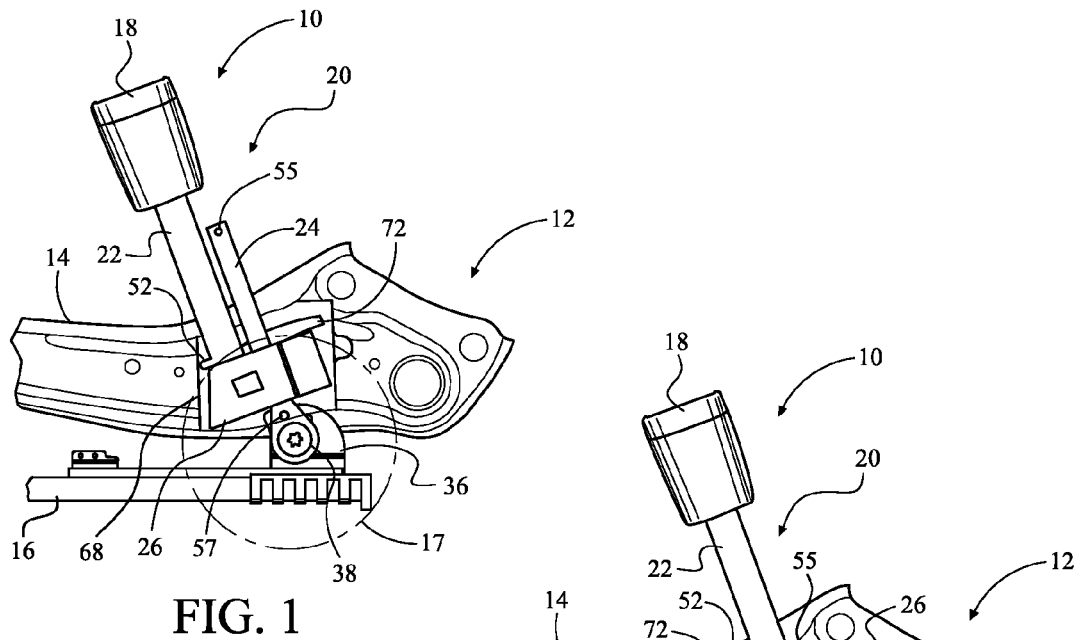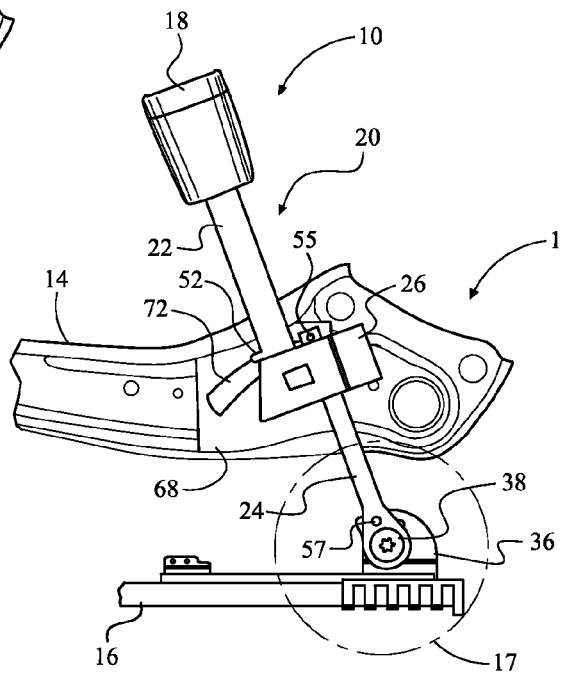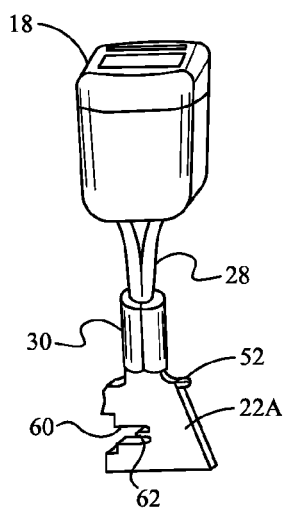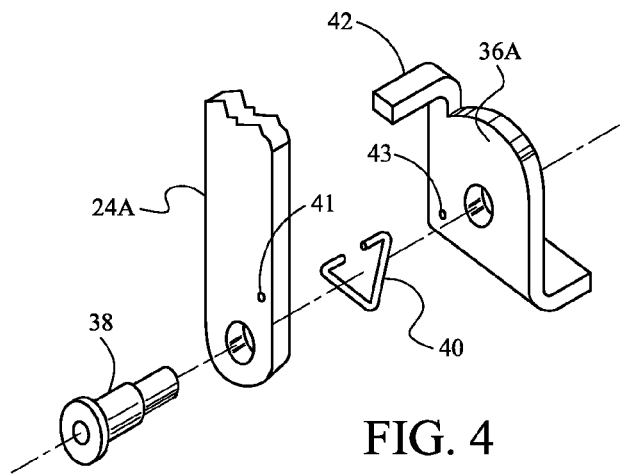

SEAT MOUNTED BUCKLE PRESENTER

CROSS REFERENCE TO RELATED APPLICATIONS

This application claims the benefit of U.S. Provisional Application No. 61/794,053, filed Mar. 15, 2013, which is hereby incorporated by reference in its entirety.

TECHNICAL FIELD

The present invention relates to a seat mounted buckle presenter for a vehicle seat of a vehicle.

BACKGROUND

Seat belt buckle systems for vehicles generally include a seat belt buckle presenter, which makes the seat belt buckles more visible and more easily accessible for movement to the engaged position. Seat belt buckle presenters generally are of a uniform length, and as such, do not adjust with a change in position of the vehicle seat.

SUMMARY

A buckle presenter for moving a seat belt buckle with a vehicle seat of a vehicle is provided. The vehicle seat generally has a seat frame that is connected to a seat adjustment mechanism for moving the vehicle seat. The buckle presenter includes an anchor strap and a buckle strap. The anchor strap is anchored with respect to the vehicle seat such that the anchor strap is substantially restricted from moving vertically when the vehicle seat is being adjusted vertically. The buckle is attachable to the buckle strap, which in turn is connectable to the seat frame of the vehicle seat such that the buckle strap moves with the vehicle seat when it is being adjusted vertically. The buckle strap is configured to move along the anchor strap. When a load is applied to the buckle, the anchor strap and the buckle strap are configured to interlock such that the buckle is substantially restricted from moving vertically A seat belt buckle assembly is also provided. The seat belt buckle assembly generally includes a buckle and the buckle presenter described above.

A seat assembly for a vehicle having a vehicle body is further provided. The seat assembly includes a seat frame, a seat adjustment mechanism, and the seat belt buckle assembly described above. The seat adjust mechanism is attached to the vehicle body, and the seat frame is attached to the seat adjustment mechanism. The seat adjustment mechanism is configured to adjust the seat frame in at least one of a longitudinal direction and a vertical direction.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIGS. 1 and 2 are schematic, side views of a seat belt buckle assembly having a buckle presenter in a fully retracted position and a fully extended position, respectively;

FIG. 3 is a schematic, perspective view of a buckle attached to a buckle strap of the buckle presenter of FIGS. 1 and 2;

FIG. 4 is a schematic, exploded, partial perspective view of an assembly of an anchor strap and an anchor of the buckle presenter of FIGS. 1 and 2;

DETAILED DESCRIPTION

Figure 5:
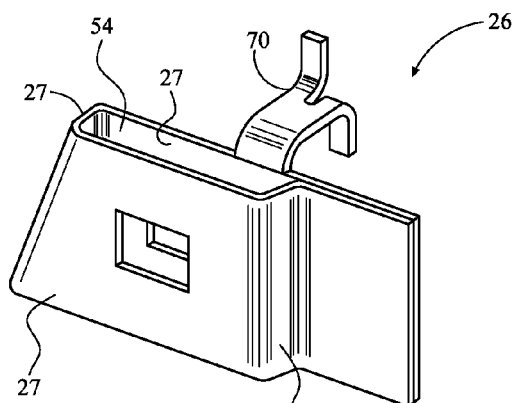
FIG. 5 is a schematic, perspective view of a housing of the buckle presenter of FIGS. 1 and 2.

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Referring to the drawings, wherein like reference numbers correspond to like or similar components wherever possible throughout the several figures, a seat belt buckle assembly 10 for a vehicle seat 12 is shown in FIGS. 1 and 2. The vehicle seat 12 generally has a seat frame 14, and is mounted to the vehicle body (not shown) via a seat adjustment mechanism 16. The seat adjustment mechanism 16 is configured to move the vehicle seat 12 longitudinally (i.e., fore and aft) and/or vertically (i.e., up and down). The vertical movement of the vehicle seat 12 generally is via a rotational path 17, as depicted by the transition of the vehicle seat 12 from a fully down position in FIG. 1 to a fully up position in FIG. 2. The vehicle seat 12 may be in any vertical position between the fully down position and the fully up position. It should be appreciated that the longitudinal position of the vehicle seat 12 relative to the vertical position may vary depending upon the trajectory, i.e., the rotational path 17, of the seat adjustment mechanism 16.

The seat belt buckle assembly 10 generally is part of a larger seat belt assembly (not shown) that includes at least one seat belt strap, which may be attached to the vehicle body on the other side of the vehicle seat 12, and a seat belt latch plate connected to the at least one seat belt strap. The seat belt assembly also may have at least one pretensioner to preemptively tighten the seat belt strap.

Figure 13:
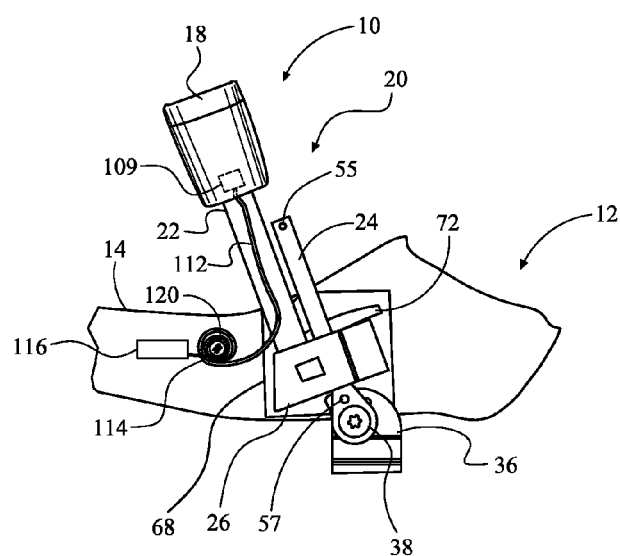
FIG. 13 is a schematic, side view of the seat belt buckle assembly according to another embodiment of the present invention.

The seat belt buckle assembly 10 includes a buckle 18 and a buckle presenter 20. The buckle 18 is configured to receive and securely hold the seat belt latch plate such that the seat belt strap may be secured around the torso and/or lap of an occupant of the vehicle seat 12. The seat belt buckle assembly 10 may include a buckle switch 109, as seen in FIG. 13 and described in more detail hereinafter, that indicates if the seat belt latch plate is secured and buckled to the buckle 18.

The buckle presenter 20 is configured to move the buckle 18 with the vehicle seat 12 when it is adjusted via the seat adjustment mechanism 16. This allows the buckle 18 to be maintained in substantially the same position in relation to the occupant of the vehicle seat 12, irrespective of the position of the vehicle seat 12. When the vehicle seat 12 is in the fully down position, as seen in FIG. 1, the buckle presenter 20 is in a fully retracted position. When the vehicle seat 12 is in the fully up position, as seen in FIG. 2, the buckle presenter 20 is in a fully extended position. The buckle presenter 20 may be in any position between the fully retracted position and the fully extended position as dictated by the vertical position of the vehicle seat 12, described in more detail hereinafter.

The buckle presenter 20 includes a buckle strap 22 and an anchor strap 24. The buckle strap 22 and the anchor strap 24 may be made of or may contain rigid bars, cables, and the like, or a combination thereof. The buckle 18 is attached to an end of the buckle strap 22, either directly or indirectly. In one embodiment depicted in FIG. 3, the buckle 18 may be attached to the buckle strap 22A via cables 28. The cables 28 may be secured to an end of the buckle strap 22A via a collar 30 crimped around the cables 28 and the end of the buckle strap 22A. The cables 28 may provide compliance such that the buckle 18 may move forward when subjected to buckle loading, i.e., when a tension is applied to the seat belt strap and, therefore, to the buckle 18, such as when the occupant of the vehicle seat 12 is moving forward and/or upward, and/or the seat belt pretensioner is deployed. In another embodiment not shown, the buckle 18 may be attached to the buckle strap 22 via a joint and a pin. This enables the buckle 18 to be rotatable around the pin relative to the buckle strap 22, which may occur during buckle loading. The joint may be bent such that the buckle 18 is angled in a certain direction, e.g., toward or away from the occupant, for more desirable accessibility by the occupant, or more clearance to a surrounding component such as a center console adjacent to the vehicle seat 12. In yet another embodiment not shown, the buckle strap 22 may be angled to achieve this effect.

Referring back to FIGS. 1 and 2, the anchor strap 24 may be attached to the seat adjustment mechanism 16 via an anchor 36. This may enable the seat belt buckle assembly 10 to move longitudinally with the vehicle seat 12 and the corresponding occupant seating position. This provides a vertically-fixed anchor point such that the bottom of the buckle presenter 20 is rigidly attached in a vertical manner at this location as it moves between the fully retracted and the fully extended positions. The anchor strap 24 may be attached to the anchor 36 via an anchor fastener 38, which may be, but is not limited to, a bolt, a stud, a nut, a washer, and the like. In other embodiments not shown, the anchor strap 24 may be directly attached to the seat adjustment mechanism 16 without the anchor 36, or directly to the vehicle body, depending upon the different adjustment configurations of the vehicle seat 12 and the seat belt buckle assembly 10 enabled by the seat adjustment mechanism 16.

The anchor strap 24 may be rotatable around the anchor fastener 38. As such, the anchor strap 24 and the anchor 36 may include provisions to limit the rotation, i.e., a rotational stop, as well as a means to reset the anchor strap 24 into a preferred rotational position. Referring now to FIG. 4, to limit the rotation, the anchor 36A may include at least one tab 42 with which the anchor strap 24A comes into contact when it rotates to a certain angle. It should be appreciated that the tab(s) 42 may be on the anchor strap 24A in addition to or in lieu of the anchor 36A. In embodiments in which both the anchor 36A and the anchor strap 24A have tabs 42, the rotation of the anchor strap 24A may be stopped when the respective tabs 42 come into contact with each other. The tabs 42 may be bent, as seen in FIG. 4.

To reset the position of the anchor strap 24A, the anchor strap 24A may include a reset spring 40. The reset spring 40 may be a bent wire spring, as seen in FIG. 4, configured to catch in holes 41 and 43 in the anchor strap 24A and the anchor 36A, respectively. When the anchor strap 24A rotates in either direction, the spring 40 biases the anchor strap 24A back to its original rotational position. It should be appreciated that any spring, including, but not limited to, a coil spring, an elongated piece of spring material, and a washer with waves, that is capable of achieving this effect is contemplated. The anchor strap 24A may also include a washer (not shown), including, but not limited to, a spring washer, on either side of the reset spring 40.

Referring back to FIGS. 1 and 2, the buckle presenter 20 also includes a housing 26 configured to hold the buckle strap 22 and the anchor strap 24 together such that the buckle strap 22 is able to slide along the anchor strap 24 when moving with the vehicle seat 12 in the vertical direction. The housing 26 may have walls 27 that define a cavity 54 around the buckle strap 22 and the anchor strap 24, as seen in FIG. 5. This may ensure that the buckle strap 22 and the anchor strap 24 do not become disassembled from each other. The housing 26 may be made of one or more pieces. In addition, the cavity 54 may or may not be completely enclosed around the buckle strap 22 and the anchor strap 24.

The buckle presenter 20 also may include an isolation insert (not shown) to be inserted into the cavity 54 of the housing 26. The isolation insert serves to separate the housing 26 from the buckle strap 22 and the anchor strap 24 to prevent corrosion and rattling of the components. The isolation insert may be sized with minimum clearance such that it fits tightly within the housing 26. Alternatively, the isolation insert may have a flange configured to sit on the walls 27 of the housing 26. The isolation insert may be made out of any material including, but not limited to, plastic, and may be formed by injection molding, bending, or the like.

In another embodiment, in lieu of or in addition to the isolation insert, the buckle presenter 20 may utilize a lubricant, including, but not limited to, grease, between the moving parts. In addition, any component of the buckle presenter 20 may be painted or otherwise coated to prevent corrosion.

The buckle presenter 20 further may include a cover (not shown) configured to substantially cover the buckle presenter 20 to prevent contaminants from entering it. The cover may be made of, but is not limited to, rubber, plastic, and the like.

Figure 6:
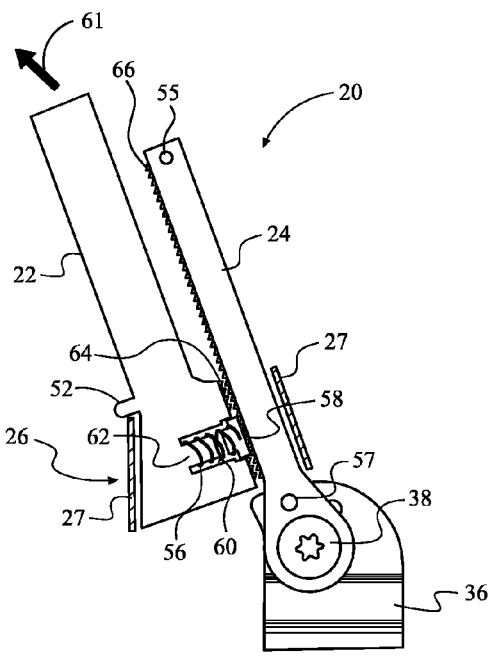
FIGS. 6 and 7 are schematic, side views of the buckle presenter of FIGS. 1 and 2 in a disengaged and an engaged position, respectively.
Figure 7:
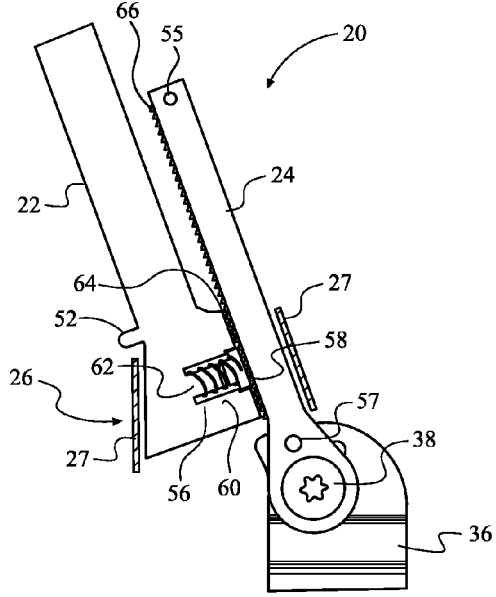

Referring now to FIGS. 6 and 7, in which a wall 27 of the housing 26 is cut away, the buckle presenter 20 is shown in an unengaged and an engaged position, respectively. In the unengaged position, the housing 26 and the buckle strap 22 generally are in contact with each such that they move together with the vehicle seat 12. The buckle strap 22 may have a protrusion 52 that rests on a wall 27 of the housing 26 to maintain this contact via gravity and without the use of any fasteners or other hardware. In another embodiment not shown, the buckle strap 22 and the housing 26 may each have corresponding holes or slots configured to receive a pin or other fastener such that they are securely held together. In another embodiment not shown, the buckle strap 22 and the housing 26 may be a singular component.

The anchor strap 24 may include an upward stop 55 and/or a downward stop 57 (translational stops), at opposite ends of the anchor strap 24. The upward stop 55 and the downward stop 57 are configured to come into contact with a wall 27 of the housing 26 to prevent the housing 26 and the buckle strap 22 from moving too far upward and downward, respectively, along the anchor strap 24 such that they become completely disconnected. The upward stop 55 and the downward stop 57 may be protrusions from the anchor strap 24. In another embodiment, the downward stop 57 may be a pin that is inserted through corresponding holes in at least one of the anchor strap 24 and the anchor 36.

The buckle strap 22 and the anchor strap 24 are normally spaced apart such that the buckle strap 22 may move along the anchor strap 24 with minimal or no interference when the vehicle seat 12 is moving vertically, as explained above. To achieve this, the buckle presenter 20 may include at least one spacing spring 56 and at least one spacer 58 to maintain separation between the buckle strap 22 and the anchor strap 24. One end of the spacing spring 56 may be attached to the buckle strap 22 and the other end attached to the spacer 58. The spacing spring 56 also may be attached to the housing 26. The buckle strap 22 may include a notch 60 and a stub 62 therewithin (as best shown in FIG. 3) for the spacing spring 56 to attach to the buckle strap 22. The spacer 58 is in contact with the anchor strap 24. As the buckle strap 22 is moving along the length of the anchor strap 24, the spacer 58 may be in contact with anchor strap teeth 66 of the anchor strap 24, as described in more detail hereinafter. As such, the spacer 58 may be designed such that it can slide across the anchor strap teeth 66 without becoming engaged with them such that movement would be restricted. In addition, the spacer 58 may be made of a harder material than the anchor strap teeth 66 so that they do not wear away the spacer 58. In another embodiment, the spacer 58 may be located such that it is in contact with a portion of the anchor strap 24 adjacent to the anchor strap teeth 66, while still effectively maintaining the spacing between the buckle strap 22 and the anchor strap 24. In yet another embodiment (not shown), the spacing spring 56 and the spacer 58 may be combined into a single component.

The housing 26 is shaped and configured such that when there is buckle loading, as depicted by the arrow 61 and as described above, the shape of the housing 26 guides the buckle strap 22 toward the anchor strap 24. To guide the buckle strap 22 as such, a wall 27 of the housing 26 in contact with the buckle strap 22 may be set at an angle different than that of the anchor strap 24 such that it acts as a wedge to force the buckle strap 22 into the anchor strap 24. The spacing spring 56 subsequently compresses until the buckle strap 22 and the anchor strap 24 are engaged such that the buckle strap 22 is restricted from further movement. This allows the forces being transmitted on the buckle 18 from the seat belt strap to be transferred directly along the buckle strap 22 to the anchor strap 24 and the anchor 36 rather than being transmitted on or through the seat frame 14. Once there is no longer any buckle loading, the spring 56 releases, thereby resetting the buckle strap 22 and the anchor strap 24 to a condition where there is spacing between them, as seen in FIG. 7.

To enable the buckle strap 22 and the anchor strap 24 to engage, the buckle strap 22 may include at least one buckle strap tooth 64 configured to engage with one of the anchor strap teeth 66. It should be appreciated that there may be more than one buckle strap tooth 64 along the length of the buckle strap 22 to engage with multiple anchor strap teeth 66 to interconnect the buckle strap 22 and the anchor strap 24 when there is buckle loading. The buckle strap tooth 64 and the anchor strap teeth 66 may consist of sharp or rounded protrusions that may be in a defined pattern with defined spacing between them, or a more random pattern without defined, discrete spacing between them, and may be different sizes and/or shapes. In one embodiment, the anchor strap teeth 66 may be rounded such that they do not damage the spacer 58 as the buckle strap 22 is moving along the anchor strap 24 with the vehicle seat 12. The buckle strap teeth 64 and the anchor strap teeth 66 may be any shape, size, and orientation capable of interlocking the buckle strap 22 and the anchor strap 24, while still being releasable from being interlocked. To accomplish this, the buckle strap tooth 64 and/or the anchor strap teeth 66 may have an angled shape on one side that is designed with respect to the direction of motion of the buckle strap 22 into the anchor strap 24. This enables the buckle strap 22 and the anchor strap 24 to engage when there is buckle loading, and to disengage when the buckle loading ceases and the spacing spring 56 pushes the buckle strap 22 away from the anchor strap 24, as described above. The buckle strap tooth 64 and the anchor strap teeth 66 may also be of the same or differing stiffness and strength as the buckle strap 22 and/or the anchor strap 24. Alternatively, there may be a layer of material with a high coefficient of friction, such as rubber, between the buckle strap 22 and the anchor strap 24 in lieu of or in addition to the buckle strap tooth 64 and the anchor strap teeth 66.

It should be appreciated that any other interlocking or grabbing mechanism, device, or the like that may enable the buckle strap 22 and the anchor strap 24 to be interlocked may be utilized in lieu of the buckle strap tooth 64 and/or the anchor strap teeth 66, or to move the buckle strap 22 into the anchor strap 24 such that they are mechanically engaged. Such other mechanisms and/or devices may include, but are not limited to, wood clamps, adjustable seatbelt guides, and the like, which may include rollers, levers, translating components, rotating components, one or more springs, structural housings, and the like.

For example, in one embodiment not shown in which the buckle strap 22 and the housing 26 are securely attached via a pin joint or mating surfaces, or are integrated together as a singular component, as mentioned above, the housing 26 may include a lever within the housing 26 that is configured to come into contact with the anchor strap 24. The lever may be angled with respect to the housing 26 and the anchor strap 24 such that when there is buckle loading, the lever is rotated by the movement of the buckle strap 22 and contacts the anchor strap 24, thereby compressing it between a wall 27 of the housing 26 and the lever. The anchor strap 24 may have anchor strap teeth 66, and the contact wall 27 and/or the lever may have corresponding teeth that engage with the anchor strap teeth 66 such that they are interlocked and movement is restricted. The teeth may be located between the lever and the anchor bar 24. This embodiment enables the housing 26 to become a member that transmits loads from the interlock between the buckle strap 22 and the anchor strap 24. In such an embodiment, the buckle strap tooth 64 may not be necessary. In addition, there may be at least one spacing spring 56 to provide spacing between the housing 26 and the anchor strap 24 when there is no buckle loading. As a variation of this embodiment, the anchor strap 24 may be a wedge with rotational movement.

In yet another embodiment not shown, the anchor strap 24 may engage with the buckle strap 22 via a translating lock bar mechanism. In such an embodiment, the buckle strap 22 may define a slot set at an angle with respect to the buckle strap 22. The slot is configured to receive and engage with a fastener attaching the housing 26 and the buckle strap 22. When the buckle 18 undergoes buckle loading, the fastener forces the buckle strap 22 to move toward the anchor strap 24 via the path of the angled slot such that the buckle strap 22 and the anchor strap 24 become interlocked via the buckle strap teeth 64 and the anchor strap teeth 66. The buckle strap 22 may also include notches in which spacing springs 56 may be located to provide spacing between the buckle strap 22 and the anchor strap 24 such that they are disengaged when there is no buckle loading. In a variation of this embodiment, the housing 26 may define the slot. When the buckle 18 undergoes buckle loading, the buckle strap 22 and the fastener move relative to the housing 26. The housing 26, in turn, forces the buckle strap 22 to move toward the anchor strap 24 via the path of the angled slot such that the buckle strap 22 and the anchor strap 24 become interlocked. In yet another variation, the fastener may be the device that interfaces between the buckle strap 22 and the anchor strap 24, and communicates the interlock forces between them.

In yet another embodiment not shown, a rotating lever may be anchored to the buckle strap 22 such that it contacts the housing 26. The rotating lever may define a slot along the length of the rotating lever through which the anchor strap 24 fits. When there is buckle loading, the buckle strap 22 moves such that the rotating lever rotates, causing it to engage with the anchor strap 24, and thereby interlocking the buckle strap 22 and the anchor strap 24. At least one spring element may be included to prevent the interlocking of the buckle strap 22 and the anchor strap 24 when there is no buckle loading, as well as to allow the buckle presenter to reset after buckle loading is removed. The anchor strap 24 may have anchor strap teeth to better enable the interlocking.

Figure 8:
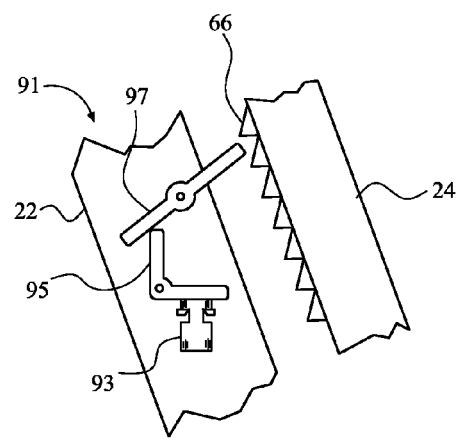
FIG. 8 is a schematic, partial side view of the buckle presenter according to another embodiment of the present invention.

Referring now to FIG. 8, the buckle presenter 20 also may include an acceleration-based locking system 91 to lock the buckle strap 22 from moving along the anchor bar 24 when the acceleration of the vehicle exceeds a threshold value. The acceleration-based locking system 91 may include a movable mass 93, a first lever arm 95 and a second lever arm 97 attached to the buckle strap 22. The movable mass 93 may be a weight that swings like a pendulum when the vehicle accelerates. The first lever arm 95 is in contact with the movable mass 93 and the second lever arm 97 such that when the acceleration exceeds the threshold, the movement of the movable mass 93 pushes the first lever arm 95, which in turn pushes the second lever arm 97 into the anchor strap teeth 66, thereby locking the buckle strap 22. When the acceleration falls below the threshold value, gravity would cause the acceleration-based locking system 91 to reset. It should be appreciated that the acceleration-based locking system 91 may have only the first lever arm 95 that engages with the anchor strap teeth 66. In addition, the movable mass 93 may also be, but is not limited to, a ball that rolls inside a partial cup with the acceleration of the vehicle.

Referring back to FIGS. 1 and 2, the seat belt buckle assembly 10 may also include a seat attachment member 68. The seat attachment member 68 is configured to connect the housing 26, and therefore the buckle strap 22, to the seat frame 14 such that the buckle strap 22 moves vertically with the vehicle seat 12, as explained above. The seat attachment member 68 is attached to the seat frame 14, and as such may be shaped to follow the contours and/or perimeter of the seat frame 14. The seat attachment member 68 may be attached to the seat frame 14 via fasteners (not shown). In another embodiment not shown, the seat attachment member 68 may incorporate flanges and/or other variations such that it may attach to the seat frame 14 without any fasteners. The seat attachment member 68 may be made of plastic, metal, or a combination thereof.

Figure 9:
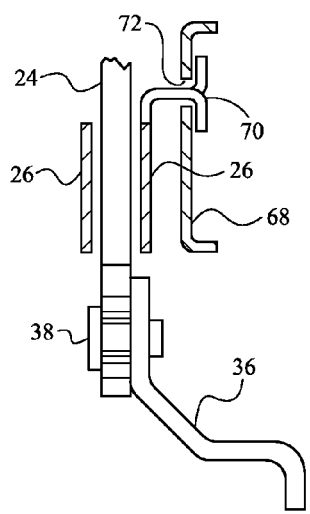
FIG. 9 is a schematic, partial front view and partial cross-sectional view of the buckle presenter of FIGS. 1 and 2.

Referring now to FIG. 9, to connect the housing 26 and the seat frame 14 together, the housing 26 may include a retention flange 70, as seen in FIG. 5, and the seat attachment member 68 may define an opening 72, such as a receiving slot, configured to receive the retention flange 70. The retention flange 70 may be integral to or a separate piece attached to the housing 26, and may be shaped such that it is able to catch on the other side of the seat attachment member 68 after being inserted through the opening 72 such that the housing 26 is attached to the seat frame 14. The opening 72 generally is shaped to match the rotational travel path of the buckle strap 22 and the housing 26 as the vehicle seat 12 is being adjusted vertically, as seen in FIGS. 1 and 2. The opening 72 also allows for forward movement of the buckle 18 when it rotates forward during buckle loading. It should be appreciated that the housing 26 may have the opening 72, and the seat attachment member 68 may have the retention flange 70. It should also be appreciated that the opening 72 may be integral to the seat frame 14, thereby eliminating the need for the seat attachment member 68. It should further be appreciated that the opening 72 may be any shape and size other than a receiving slot that may or may not enable movement of the retention flange 70 relative to it.

It should further be appreciated that any other device or hardware capable of attaching the housing 26 to the seat attachment member 68 and/or the seat frame 14 is contemplated. For example, in another embodiment not shown, in lieu of the retention flange 70, the housing 26 may include a block attachment that is inserted through the opening 72 from the other side of the seat attachment member 68 before being attached to the housing 26. The block may have extensions such that when the block is inserted through the opening 72, the extensions catch on the seat attachment member 68, similar to the retention flange 70. The housing 26 may then be attached to the block via fasteners or other attachment hardware to hold the housing 26 together with the seat attachment member 68. The head of the fastener also may act as the retention flange 70.

Figure 10:
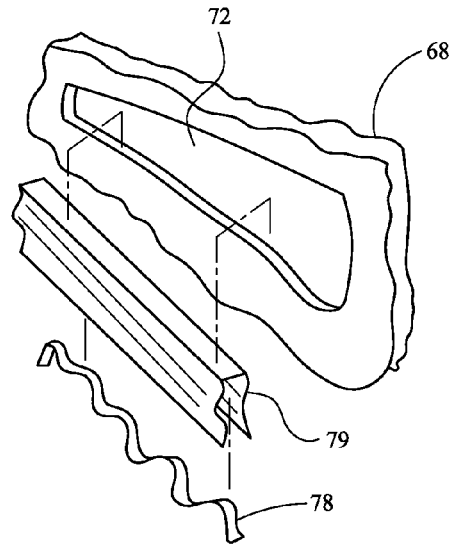
FIG. 10 is a schematic, exploded, partial perspective view of a seat attachment member of the seat belt buckle assembly of FIGS. 1 and 2.

In any of the embodiments described above, the seat attachment member 68 may include a spring insert 78 inserted in the opening 72, as seen in FIG. 10. When the retention flange 70 (or the block attachment) is inserted through the opening 72, it engages with the spring insert 78, which in turn engages with an edge of the opening 72 to provide a secure fit of the retention flange 70 within the opening 72. This may prevent any potential rattling of the retention flange 70 within the opening 72. It may also allow a small amount of motion of the retention flange 70, and therefore the housing 26, when there is buckle loading, as described above, to protect the housing 26 and the seat attachment member 68. The spring insert 78 may be any spring, including, but not limited to, a coil spring, a wave spring, and the like. The spring insert 78 may be configured to engage with only a lower edge of the opening 72, in which embodiment it may have a U-shaped collar 79 surrounding it as seen in FIG. 10, or with both the lower edge and a top edge. In another embodiment not shown, the spring insert 78 may be shaped such that it prevents rattling in a lateral direction resulting from lateral movement between adjacent components, such as the housing 26 and the seat attachment member 68.

Figure 11:
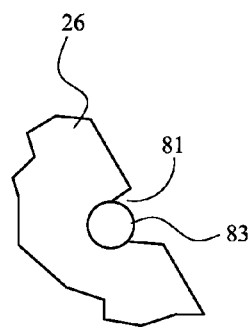
FIGS. 11 and 12 are schematic, partial front views of the housing of FIG. 5 according to another embodiment of the present invention.
Figure 12:
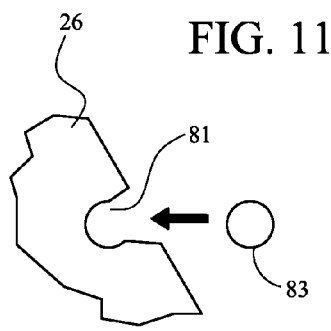

In addition, the housing 26 and/or the seat attachment member 68 may be configured to break away from the seat frame 14, thereby detaching the seat belt buckle assembly 10 from the seat frame 14, when the buckle loading exceeds a predetermined force level. To accomplish this, the housing 26 and/or the seat attachment member 68 may define at least one partial opening 81 configured to receive a device such as a pin 83, as seen in FIG. 11. The pin 83 may extend from the seat frame 14, the seat attachment member 68, or the housing 26. When the buckle loading exceeds the predetermined force level, the pin 83 may pull out of and disengage from the partial opening 81, as seen in FIG. 12, thereby disengaging the housing 26 from the seat frame 14.

Referring now to FIG. 13, as mentioned above, the seat belt buckle assembly 10 may include a buckle switch 109 to indicate whether or not the seat belt latch plate is buckled to the buckle 18. To transmit the signal, the buckle presenter 20 may include an electronic wire 112 that is connected at one end to the buckle switch 109 and runs along the buckle strap 22. The electronic wire 12 may be maintained in a wire harness 114, terminating at a connector 116 to which an electronics and/or communication system (not shown) within the vehicle connects. The wire harness 114 generally includes enough length and slack such that the buckle 18 and the buckle strap 22 may move without damaging the electronic wire 112. The wire harness 114 may be wrapped around a pin 120. In another embodiment not shown, the wire harness 114 may be wrapped around a coil spring in addition to or in lieu of the pin 120. In yet another embodiment not shown, the wire harness 114 may be wrapped into a coil without support or may be bent to have a U-shaped portion to act as a strain relief. The pin 120, as well as the connector 116, may be secured to the seat frame 14. In addition, the wire harness 114 may be secured to the seat frame 14 or the buckle strap 22 at any location via a separate fastener (not shown).

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A buckle presenter for moving a seat belt buckle with a vehicle seat of a vehicle, the vehicle seat having a seat frame connected to a seat adjustment mechanism for moving the vehicle seat, the buckle presenter comprising:
   an anchor strap that is anchored with respect to the vehicle seat such that the anchor strap is restricted from moving vertically when the vehicle seat is being adjusted vertically; and
   a buckle strap to which the seat belt buckle is attachable, the buckle strap being connectable to the seat frame of the vehicle seat such that the buckle strap moves with the vehicle seat when it is being adjusted vertically, the buckle strap being configured to move along the anchor strap;
   a housing configured to guide the buckle strap along the anchor strap when the vehicle seat is being adjusted vertically, wherein the housing is attachable to the seat frame;
   wherein the anchor strap and the buckle strap are configured to interlock such that the buckle strap is substantially restricted from moving vertically when a load is applied to the seat belt buckle; and
   wherein at least one of the buckle strap and the anchor strap comprises at least a portion of an interlocking mechanism configured to interlock the buckle strap and the anchor strap when the load is applied to the seat belt buckle, and the interlocking mechanism comprises at least one set of teeth on at least one of the anchor strap and the buckle strap.

2. The buckle presenter of claim 1 wherein the anchor strap comprises at least one translational stop to limit movement of the buckle strap along the anchor strap.

3. The buckle presenter of claim 1 further comprising an electronic wire to which the seat belt buckle is connectable, the electronic wire having a length that provides slack such that it extends when the seat belt buckle moves.

4. The buckle presenter of claim 1 further comprising at least one of a spacer and a spacing spring configured to maintain a distance between the buckle strap and the anchor strap in a normal position when the load is not applied to the seat belt buckle, and to enable the buckle strap to move such that it interlocks with the anchor strap when the load is applied to the seat belt buckle.

5. The buckle presenter of claim 4 wherein the at least one of the spacer and the spacing spring is configured to move back to the normal position when the load is removed from the seat belt buckle.

6. The buckle presenter of claim 1 further comprising an anchor to which the anchor strap is connected, the anchor strap being rotatable with respect to the anchor, and the anchor being connected to the seat adjustment mechanism such that the buckle presenter is movable longitudinally with the vehicle seat.

7. The buckle presenter of claim 6 wherein at least one of the anchor and the anchor strap has a rotational stop configured to limit rotation of the anchor strap.

8. A seat belt buckle assembly for a vehicle seat of a vehicle, the vehicle seat having a seat frame connected to a seat adjustment mechanism for moving the vehicle seat, the seat belt buckle assembly comprising:
   a buckle; and
   a buckle presenter having:
      an anchor strap that is anchored such that the anchor strap is restricted from moving vertically when the vehicle seat is being adjusted vertically; and
      a buckle strap to which the buckle is attachable, the buckle strap being connectable to the seat frame of the vehicle seat such that the buckle strap moves with the vehicle seat when it is being adjusted vertically, the buckle strap being configured to move along the anchor strap;
      a housing configured to guide the buckle strap along the anchor strap when the vehicle seat is being adjusted vertically, wherein the housing is attachable to the seat frame;
   wherein the anchor strap and the buckle strap are configured to interlock such that the buckle strap is substantially restricted from moving vertically when a load is applied to the buckle; and
   wherein the buckle presenter further comprises at least one of a spacer and a spacing spring configured to maintain a distance between the buckle strap and the anchor strap when the load is not applied to the buckle, and to enable the buckle strap to move such that the buckle strap interlocks with the anchor strap when the load is applied to the buckle.

9. The seat belt buckle assembly of claim 8 wherein the buckle presenter further comprises an anchor to which the anchor strap is connected, the anchor strap being rotatable with respect to the anchor, and the anchor being connected to the seat adjustment mechanism such that the buckle presenter is movable longitudinally with the vehicle seat.

10. The seat belt buckle assembly of claim 8 wherein at least one of the buckle strap, the anchor strap, and the housing comprises at least a portion of an interlocking mechanism configured to interlock the buckle strap and the anchor strap when the load is applied to the buckle.

11. The seat belt buckle assembly of claim 10 wherein the interlocking mechanism comprises at least one set of teeth on at least one of the anchor strap and the buckle strap.

12. The seat belt buckle assembly of claim 8 wherein the buckle comprises a buckle switch, the buckle presenter further comprises an electronic wire connected to the buckle switch, and the electronic wire has a length that provides slack such that the electronic wire extends when the buckle moves.

13. The seat belt buckle assembly of claim 12 further comprising a seat attachment member defining an opening that enables rotation of the buckle strap.

14. The seat belt buckle assembly of claim 13 further comprising a spring insert disposed within the opening.

15. A seat assembly for a vehicle having a vehicle body, the seat assembly comprising:
- a seat frame;
- a seat adjustment mechanism attached to the vehicle body and to which the seat frame is attached, the seat adjustment mechanism being configured to adjust the seat frame in at least one of a longitudinal direction and a vertical direction; and
- a seat belt buckle assembly having:
  - a buckle; and
  - a buckle presenter having:
    - an anchor strap that is anchored such that the anchor strap is restricted from moving vertically when the seat frame is being adjusted vertically; and
    - a buckle strap to which the buckle is attachable, the buckle strap being connectable to the seat frame such that the buckle strap moves with the seat frame when the seat frame is being adjusted vertically, the buckle strap being configured to move along the anchor strap;
    - a housing configured to guide the buckle strap along the anchor strap when the seat frame is being adjusted vertically, wherein the housing is attachable to the seat frame; and
- an interlocking mechanism configured to interlock the buckle strap and the anchor strap when a load is applied to the buckle such that the buckle strap is substantially restricted from moving vertically when the load is applied to the buckle, wherein the interlocking mechanism comprises at least one set of teeth on at least one of the anchor strap and the buckle strap.

* * * * *